Nov. 20, 1934.                    F. E. LEWIS                    1,981,601
                            ELEVATOR CONTROL SYSTEM
                    Original Filed Jan. 23, 1932    6 Sheets-Sheet 1
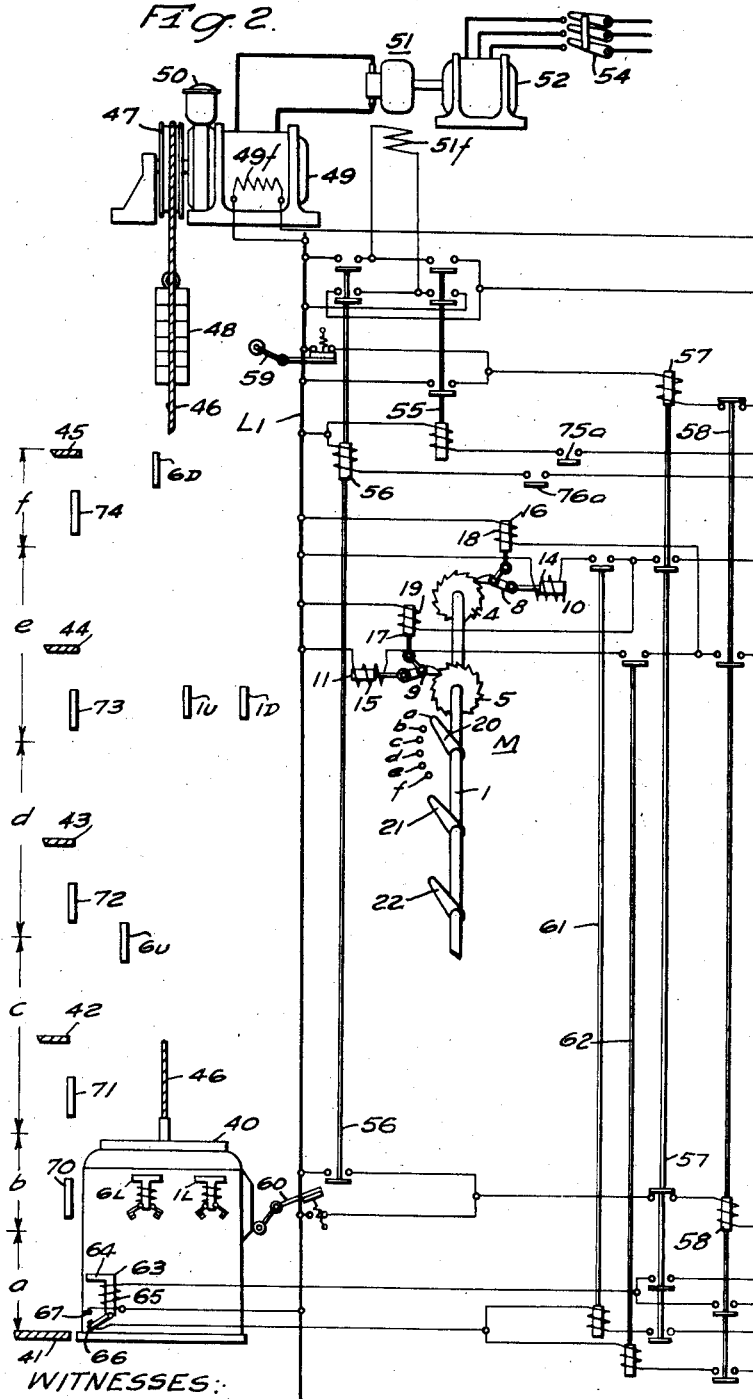
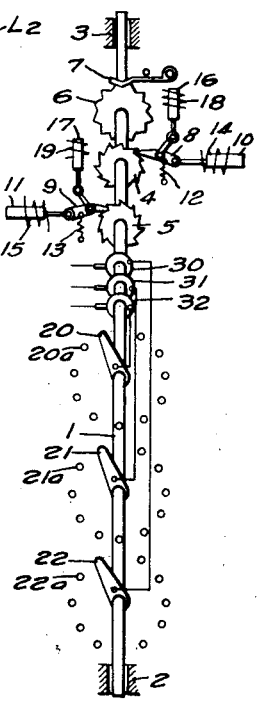
WITNESSES:
E. A. McCloskey.
Geo. O. Harrison
INVENTOR
Frank E. Lewis.
BY
ATTORNEY

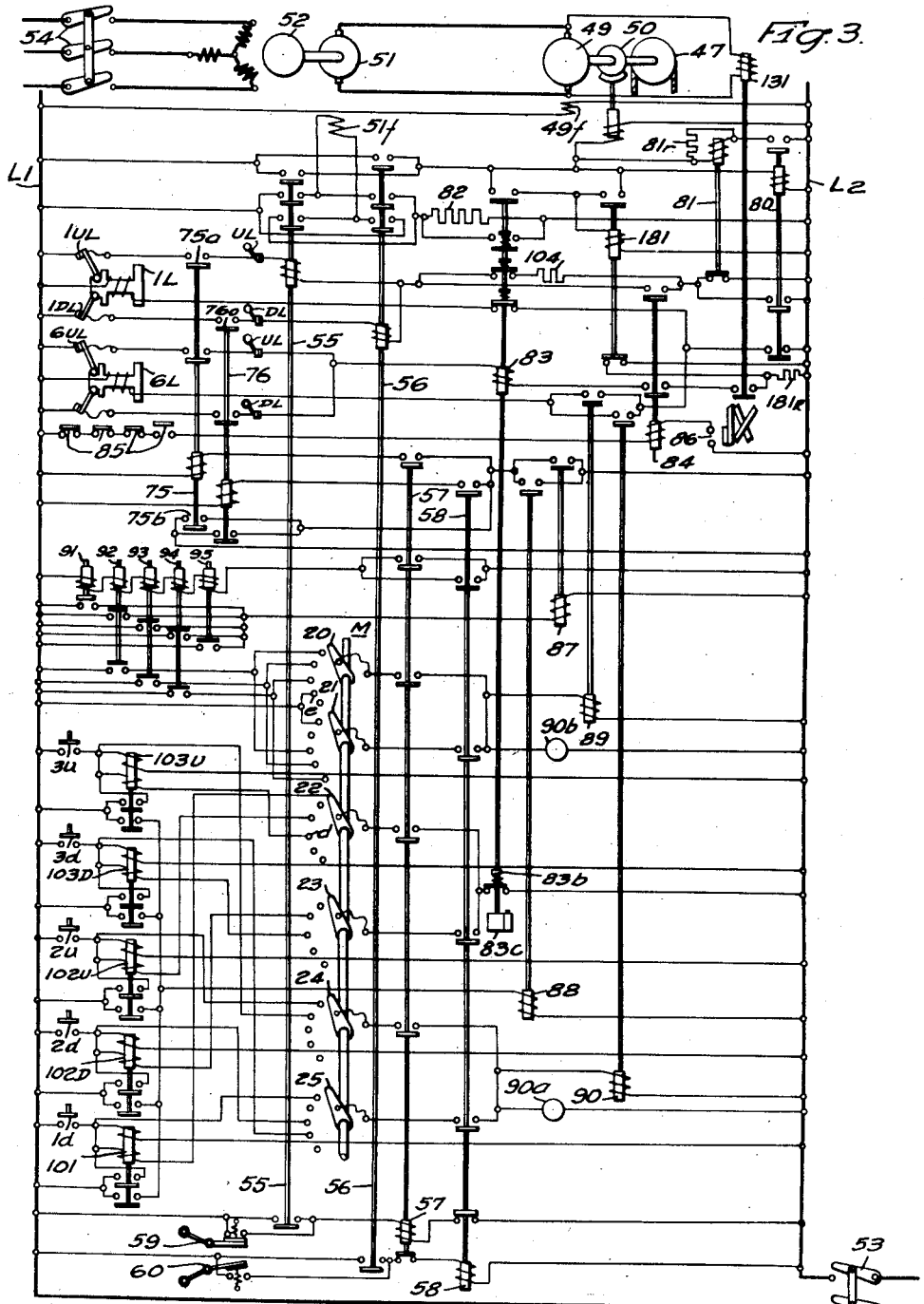

Nov. 20, 1934.　　　　　F. E. LEWIS　　　　　1,981,601
ELEVATOR CONTROL SYSTEM
Original Filed Jan. 23, 1932　　6 Sheets-Sheet 5

INVENTOR
Frank E. Lewis.
BY
ATTORNEY

WITNESSES:

Nov. 20, 1934.   F. E. LEWIS   1,981,601
ELEVATOR CONTROL SYSTEM
Original Filed Jan. 23, 1932   6 Sheets-Sheet 6
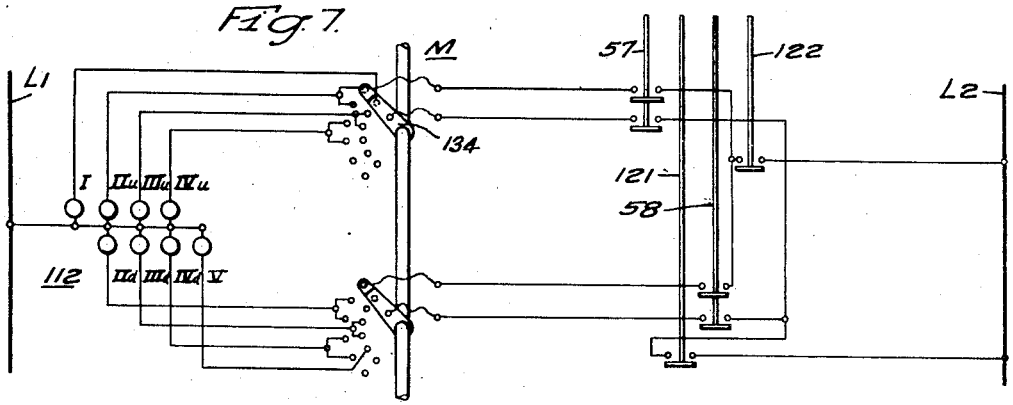
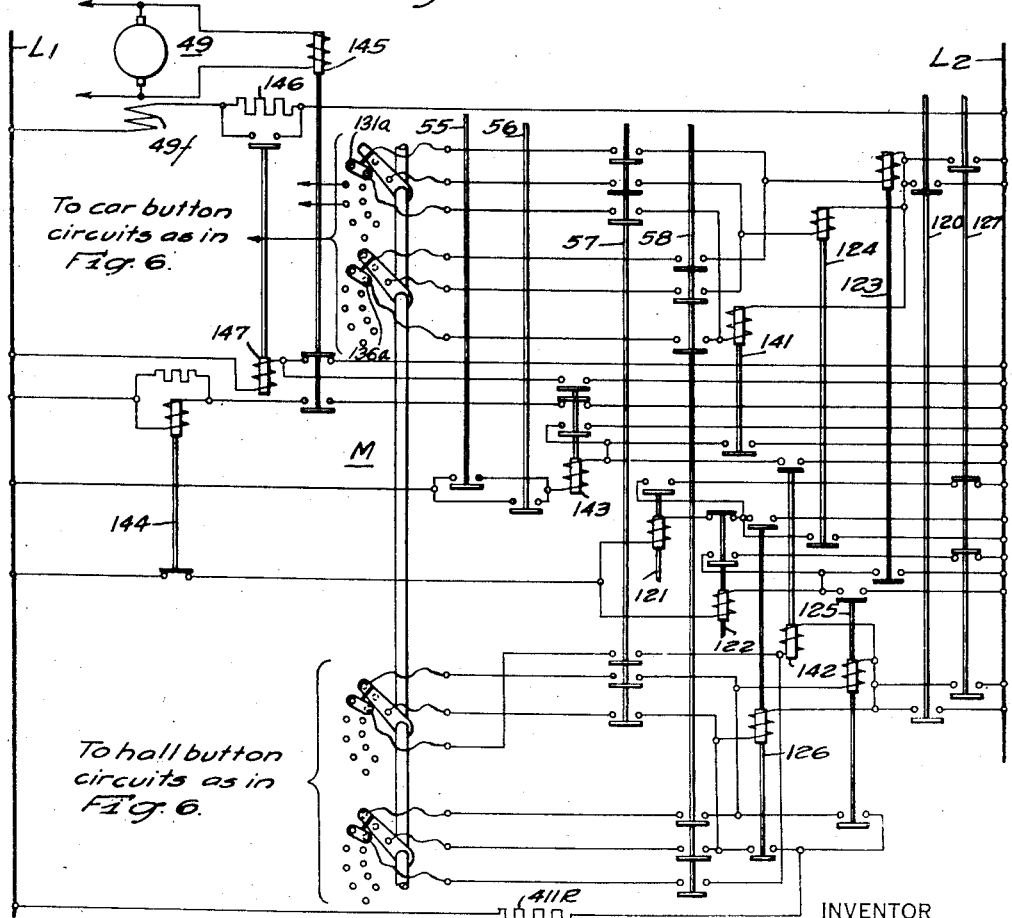

Patented Nov. 20, 1934

1,981,601

UNITED STATES PATENT OFFICE 1,981,601

ELEVATOR CONTROL SYSTEM

Frank E. Lewis, Chicago, Ill., assignor to Westinghouse Electric & Manufacturing Company, a corporation of Pennsylvania Application January 23, 1932, Serial No. 588,406
Renewed April 24, 1934

16 Claims. (Cl. 187—29)

My invention relates to elevator systems and has particular relation to a novel floor selecting mechanism for use in elevator systems and to a novel elevator control system embodying my floor selecting mechanism.

It is the practice, at the present time, to provide elevator systems, of certain types, with devices called floor selectors, for commutating certain circuits of the system in accordance with the position of the car. These devices ordinarily comprise a stationary control element upon which are mounted a plurality of stationary contact members, and a movable control element upon which are mounted a plurality of other contact members disposed to engage certain of the stationary contact members depending upon the position of the movable element. The movable element of the floor selector is commonly driven mechanically from some movable part of the elevator system, such as the motor shaft, or is driven by some form of telemotor receiver electrically controlled from a telemotor transmitter which, in turn, is driven from the motor shaft. In either form of apparatus, the movable element reproduces the movements of the elevator car, on a smaller scale, and the movable contact members engage and disengage certain of the stationary contact members when the car is in predetermined positions with reference to landings in the hatchway. In devices of this type, it is necessary that the stationary contact members be spaced, along the path of travel of the movable contact members, at fixed distances determined by the various floor heights of the building served by the elevator.

As the floor spacing in buildings is, ordinarily, individual to each building, a special layout of the stationary contact members of the floor selector is required for each building. If a mechanical drive is used, an individual design of the driving elements to conform to the relative positions of the motor and the floor selector may also be required, as the penthouses, in which the motor, floor selector and control apparatus are located, differ considerably in size and shape. In very tall buildings, the floor selector, if of a type in which the stationary contact members are mounted upon vertical supports or upon a vertical panel, is often too tall for convenient installation.

For the reasons stated above, it is not practicable to build a floor selector, in accordance with the teachings of the prior art, which shall be standard in all its parts and applicable to buildings of different heights and of different plans of the floor spacing.

It is accordingly an object of my invention to provide a novel floor selecting mechanism for elevators, in which the contact members shall be spaced from each other at distances independent of the distances between floors served by the elevator.

A further object of my invention is to provide a novel floor selecting mechanism for elevators, in which the contact members shall be spaced at uniform intervals, regardless of the distance between floors served by the elevator.

A further object of my invention is to provide a novel elevator control system.

Other objects of my invention will become evident from the following detailed description, taken in conjunction with the accompanying drawings, in which Fig. 1 is a diagrammatic view of a floor selecting mechanism organized in accordance with the present invention.

Fig. 2 is a diagrammatic view showing the relationship of certain movable parts to certain stationary parts, and also the control circuits for operating the floor selecting mechanism, of an elevator system organized in accordance with the present invention.

Fig. 3 is a diagrammatic view of the car control circuits of the elevator system shown, in part, in Fig. 2.

Figs. 5 to 7 are diagrammatic views of a modification of my invention.

Fig. 8 is a diagrammatic view of a modification of the system shown in Figs. 5 to 7.

Figure 4:
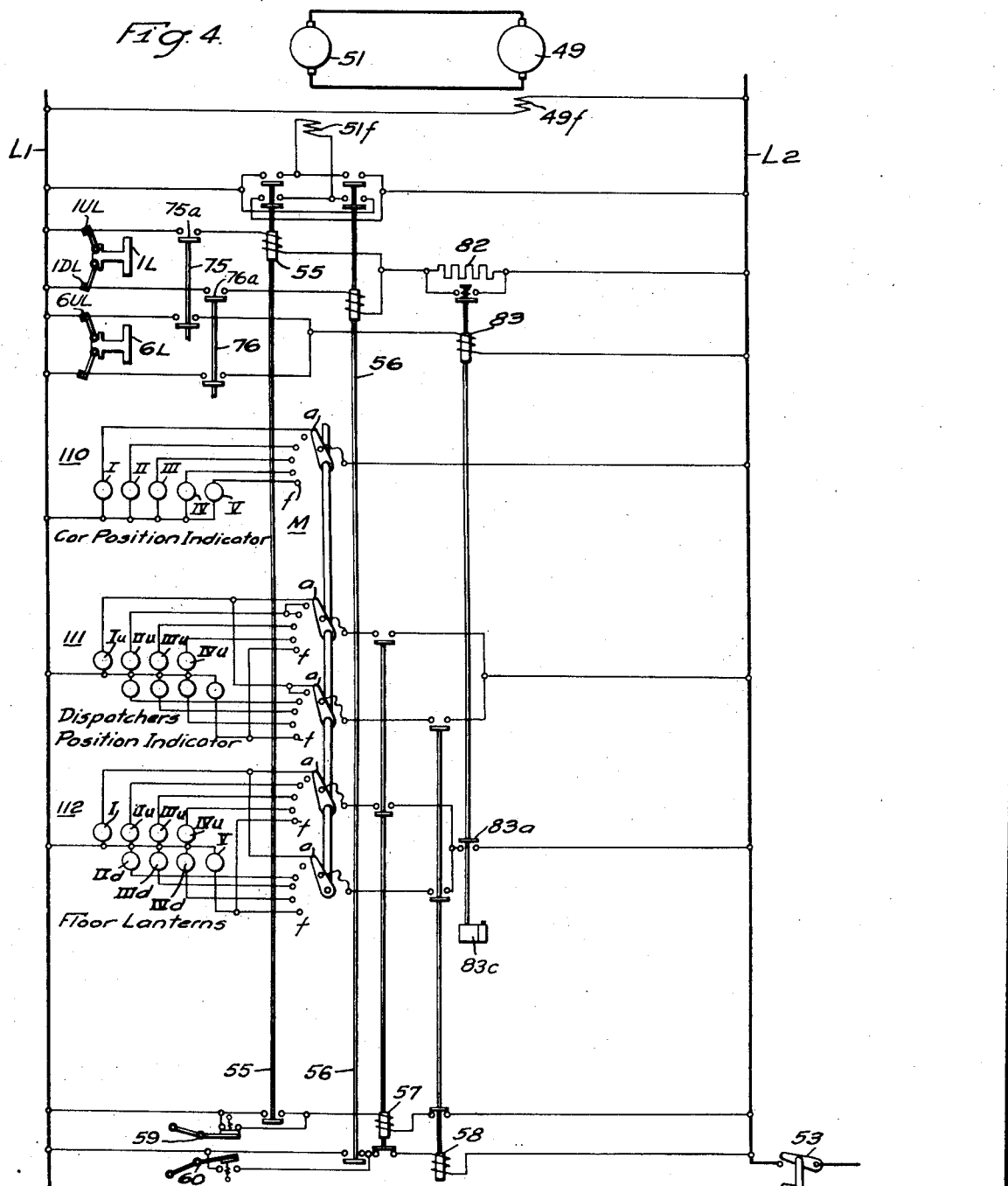
Fig. 4 is a diagrammatic view of the signal control circuits of the elevator system shown, in part, in Figs. 2 and 3.

The floor selecting mechanism shown in Fig. 1 comprises a shaft 1, rotatably mounted in suitable bearings, shown diagrammatically at 2 and 3. A pair of ratchet wheels 4 and 5 and a notched disc 6 are rigidly secured to the shaft 1 to rotate therewith. A stationary detent 7 is mounted in any suitable manner to engage the notches in the disc 6 to thereby hold the disc 6 and the shaft 1 resiliently in any of a plurality of angular positions, determined by the positions of the notches in the disc.

A pair of pawl members 8 and 9, pivoted to a pair of magnetic cores 10 and 11, respectively, are held in engagement with the ratchet wheels 4 and 5, by any suitable means, such as the springs 12 and 13. The magnetic cores 10 and 11 are mounted for longitudinal movement within stationary solenoids 14 and 15, in the same manner as in well known types of relays. The magnetic cores 10 and 11 are biased by any suitable means (not shown) outward from the shaft 1, to the positions in which they are shown in Fig. 1.

A second pair of magnetic cores 16 and 17, are provided for raising the pawl members 8 or 9, respectively, out of operative relationship with the ratchet wheels 4 or 5, against the tension of springs 12 or 13, respectively. The magnetic cores 16 and 17 are mounted within the stationary solenoids 18 and 19, and are mechanically connected to the respective pawls 8 and 9 by any suitable means.

A plurality of contact arms 20, 21 and 22 are rigidly secured to, but electrically insulated from, the shaft 1. A plurality of contact members 20a, 21a, 22a, etc., are mounted upon a suitable insulating support (not shown), in circular groups, corresponding in number to the number of contact arms 20, 21 and 22 and in positions to be engaged by the contact arms when the shaft 1 is rotated.

A plurality of slip rings, 30, 31 and 32, corresponding in number to the number of contact arms 20, 21 and 22, are rigidly secured to, but electrically insulated from, the shaft 1. Each of the slip rings 30, 31 and 32, is electrically connected to a corresponding contact arm 21, 22 and 23, respectively. Although only three contact arms and slip rings are shown in Fig. 1, it will be understood that any number may be used in practice. It will also be understood that the slip rings may be omitted and the contact arms, 21, 22, etc., connected to external circuits by means of flexible conductors.

The notches in the disc 6, the teeth of the ratchet wheels 4 and 5 and the contact members 20a, 21a, 22a, etc., respectively, are spaced peripherally at equal angular intervals about the axis of the shaft 1, and the various parts are so aligned that when the disc 6 is held in a stable angular position by the resilient detent 7, the contact arms 20, 21 and 22, each engage a contact member such as 20a, 21a and 22a, and the pawls 8 and 9 are each in a proper position to initiate an angular movement of the ratchet wheels 4 or 5, respectively. The ratcheting mechanism is so constructed that the angle through which the shaft 1 may be turned in response to a notching operation, to be hereinafter more fully described, is approximately equal to the angular interval between the notches on the disc 6.

The operation of the floor selecting mechanism shown in Fig. 1 may best be understood by reference to Fig. 2, which shows such a mechanism incorporated in an elevator system organized in accordance with the present invention. The entire control system, embodying my invention, is shown diagrammatically in Figs. 2, 3 and 4. In order that certain more or less independent parts of the control system may appear completely in a single figure, certain elements have been duplicated in Figs. 2, 3 and 4, as will hereinafter be more fully pointed out.

Referring to Fig. 2, of the drawings, the apparatus shown therein comprises an elevator car 40 operable in a hatchway to serve a plurality of landings, diagrammatically indicated at 41, 42, 43, 44 and 45. The elevator car 40 is suspended by means of a cable 46 which passes over a hoisting drum 47 to a suitable counterweight 48. The hoisting drum 47 is mounted on the same shaft as an elevator motor 49 and a spring-applied, electromagnetically-released brake 50 of usual type.

Although the elevator motor may be of any suitable direct current- or alternating-current type, controlled in any suitable manner, I have illustrated the motor 49 as of the separately-excited direct-current type, controlled in accordance with the variable voltage or Ward-Leonard principle. The armature of the motor 49 is connected in a local circuit with the armature of a separately-excited generator 51 driven at substantially constant speed by a suitable driving motor 52, which I have illustrated as an induction motor.

The field winding 49f of the direct-current motor 49 is connected to a pair of supply conductors L1 and L2, which may be connected to a constant voltage direct-current source (not shown), by means of a switch 53. The windings of the induction motor 52 may be connected to a constant voltage alternating-current source (not shown) by means of a switch 54. The field winding 51f of the generator 51 may be connected to the supply conductors L1 and L2 by means of either of a pair of direction switches 55 or 56, respectively, in a well known manner.

A pair of interlock relays 57 and 58 are provided for establishing directional "set-ups" of the control apparatus in accordance with the direction in which the car is to travel. In the illustrated embodiment of the invention, the control system is of the two-button, through-trip, collector type. In such a system, the interlock relays are controlled in accordance with the position of the car, so that the "up" interlock relay 57 is closed when the car reaches the lowermost landing 41 served by the car, and remains closed until the car reaches the uppermost landing 45. The "up" interlock relay 57 is then opened, and the "down" interlock relay 58 is closed. The "down" interlock relay 58 thereupon remains closed until the car returns to the lowermost landing, when the operation described above is repeated. A pair of cam-operated automatic switches 59 and 60 are provided for co-operating with contact members of the direction switches 55 and 56, respectively, to control the interlock relays 57 and 58. It will be understood that in systems of types other than the through-trip type, the interlock relays 57 and 58 may be controlled by means, known in the art, other than the automatic switches 59 and 60 or their equivalents.

An "up" notching relay 61 and a "down" notching relay 62 are provided for controlling the operating solenoids of a floor selecting mechanism M of the type shown in Fig. 1, the corresponding parts of which have been designated by the same reference numerals as in Fig. 1.

The operating coils of the notching relays 61 and 62 are controlled by contact members of the interlock relays 57 and 58 and by contact members of a notching inductor relay 63. The notching inductor relay 63 is mounted in the car 40 in a position to pass adjacent to each of a plurality of inductor plates 70, 71, 72, 73 and 74, of magnetic material, mounted in the hatchway. The notching inductor relay 63 comprises a magnetic structure 64, upon which is mounted an operating coil 65. An armature 66, of magnetic material, for controlling a pair of contact members 67, biased to open position, is pivoted to the magnetic structure 64. The magnetic structure 64 and the armature 66 together constitute an open C-shaped magnetic circuit having a large air gap between the overhanging portion of the magnetic structure and the free end of the armature. The operating coil 65 and the magnetic parts 64 and 66 are so designed that when the coil 65 is energized, the magnetic flux in the armature 66 is insufficient to move the armature to a position to close the contact members 67 or to retain the armature in such a position, unless the notching inductor relay 63 is opposite an inductor plate 70, 71, 72, 73 or 74. When the notching inductor relay 63 is moved past one of the inductor plates 70 to 74, the contact members 67 momentarily close while the relay is opposite the inductor plate but immediately re-open when the inductor relay passes beyond the inductor plate.

The inductor plates 70 to 74 may be mounted in the hatchway at any suitable points such that the contact members 67 of the inductor relay 63 close whenever the elevator car 40 is in a pre-determined position in which control or signal circuits are to be commutated. In the illustrated embodiment of the invention, a single inductor plate 71, 72 or 73 is provided between each two consecutive landings 42, 43, 44 and 45, which are spaced at uniform distances apart, and two inductor plates 70 and 71 are provided between the two landings 41 and 42, which are spaced at a greater distance apart. The inductor plates 71, 72 and 73 are mounted in the hatchway in positions such that the contact members 67 of the inductor relay 63 close when the platform of the car 40 is midway between any consecutive pair of the landings 42 to 45. Considering the distance between the uniformly spaced landings as a "floor height", the inductor plates 70 and 71 are mounted in positions such that the control members 67 close when the platform of the elevator car is one-half "floor height" above the first landing 41 and also when the platform is one-half "floor-height" below the second landing 42.

A pair of inductor relays 6L and 1L of the type disclosed in Patent No. 1,902,602, granted March 21, 1933 on the co-pending application of Harold W. Williams, Serial No. 279,771, filed May 22, 1928 and assigned to the Westinghouse Electric and Manufacturing Company, are provided for automatically initiating the deceleration and stopping of the car in a well known manner. The inductor relays 6L and 1L are mounted on the car 40 in positions to co-operate with sets of inductor landing plates, mounted in the hatchway. Although, for simplicity, only one complete set of inductor landing plates 6U, 1U, 1D and 6D, corresponding to the third floor has been illustrated, it will be understood that a complete set is provided for each floor between the lowermost and the uppermost floor. A set corresponding to inductor landing plates 6D and 1D is provided for the lowermost floor, and a set corresponding to inductor landing plates 6U and 1U is provided for the uppermost floor.

The inductor relays 6L and 1L are of a type, as described in the aforesaid application of Harold W. Williams, in which the contact members are biased to closed position and remain in the closed position, after the operating coil of the relay is energized until the relay arrives at a position opposite an inductor plate. Upon the arrival of the relay opposite an inductor plate, the contact members of the relay on the side nearest the inductor plate, open and remain open even though the relay moves beyond the inductor plate, until the coil of the relay is de-energized.

A pair of contact members 75a and 76a are provided for completing the circuits of the "up" direction switch 55 and the "down" direction switch 56 to start the car in the "up" or "down" directions respectively. These contact members are parts of a pair of relays 75 and 76, respectively, to be more fully described in connection with Fig. 4. As the relay mechanism and circuits for interlocking the contact members 75a and 76a play no direct part in the operation of the floor selecting mechanism M, they have been omitted from Fig. 2. Certain other elements of the system, such as an accelerating resistor in the generator field circuit and relay coils and contact members in the circuits of the direction switches have been omitted from Fig. 2, in order to simplify these circuits. The omitted elements are shown in connection with the elements with which they directly co-operate, in Figs. 3 and 4.

The operation of the apparatus shown in Fig. 2, may be set forth as follows. Preliminary to control of the car in response to operation of the contact members 75a or 76a, the switches 53 and 54 are closed. Upon closure of the switch 53, the supply conductors L1 and L2 are energized, and circuits for the field winding 49f of motor 49 and for the operating coil of "up" interlock relay 57 are completed. The circuit for the "up" interlock relay 57 extends from the supply conductor L1, through the upper automatic switch 59, the operating coil of "up" interlock relay 57 and back contact members of "down" interlock relay 58 to the supply conductor L2. The "up" interlock 57 closes to complete a circuit for the solenoid 19 of the floor selecting mechanism M; to open the circuit of "down" interlock relay 58, and to complete a circuit for the operating coil 65 of the notching inductor relay 63. Upon completion of the circuit for the solenoid 19, the core member 17 withdraws the pawl member 9 from engagement with the ratchet wheel 5, so that the shaft 1 may be turned in response to operation of the pawl member 8, as will hereinafter be described. The contact members 67 of the notching inductor relay 63 do not close at this time, as the magnetic circuit of the relay is incomplete.

Upon closure of the switch 54, the windings of the induction motor 52 are connected to the alternating current source and the motor 52, and the generator 51 accelerate to running speed. The elevator motor 49 may now be controlled in response to operation of the contact members 75a.

Upon closure of the contact members 75a, a circuit is completed for the "up" direction switch 55, and the latter switch closes to partially complete a circuit for the "down" interlock relay 57 and to connect the field winding of generator 51 to supply conductors L1 and L2. The generator 51 now generates a voltage, and the motor 49 accelerates, driving the car 40 in the "up" direction.

When the car 40 arrives at a position such that the notching inductor relay 63 is opposite the inductor plate 70, the magnetic circuit of the inductor relay 63 is completed and the contact members 67 of the relay momentarily close. The closure of the contact members 67 completes a circuit for the operating coil of the "up" notching relay 61, as follows; from supply conductor L1 through contact members 67 of the inductor relay 63, the operating coil of "up" notching relay 61 and contact members of the "up" interlock relay 57 to supply conductor L2.

The "up" notching relay 61 now momentarily closes to complete a circuit for the notching solenoid 14. This circuit may be traced from supply conductor L1, through the solenoid 14, contact members of the "up" notching relay 61 and contact members of the "up" interlock relay 57 to supply conductor L2. Upon completion of this circuit, the core member 10 moves the pawl member 8 to rotate the shaft 1, counter-clockwise, one notch and immediately returns to its biased position.

As the car 40 moves up in the hatchway, the contact members 67 momentarily close to initiate a notching operation each time the inductor relay 63 arrives at a position opposite one of the inductor plates 71 to 74. Shortly before car 40 arrives at the uppermost landing 45, the cam-operated automatic switch 59 opens to break the circuit of the "up" interlock relay 57. The "up" interlock relay 57 drops out to break the circuit of solenoid 19, to complete a circuit for the "down" interlock relay 58; to open the circuit of the operating coil 65 of notching inductor relay 63 and to open contact members in the circuit of the "up" notching relay 61. The solenoid 19 now releases the armature 17 to permit the pawl 9 to re-engage the ratchet wheel 5.

The circuit for the "down" interlock relay 58 may be traced from supply conductor L1 through the automatic switch 60, back contact members of the "up" interlock relay 57 and the operating coil of down interlock relay 58 to supply conductor L2. Upon completion of this circuit, the "up" interlock relay 58 closes, to open contact members in the circuit of "up" interlock relay; to complete a circuit for the solenoid 18 of the floor selecting device M; to complete a circuit for the operating coil 65 of the notching relay 63 and to partially complete a circuit for the "down" notching relay 62. Upon energization of the solenoid 18, the core member 16 withdraws the pawl member 8 from engagement with the ratchet wheel 4 to prepare the floor selecting device M for notching in the clockwise direction.

The contact members 75a may now be opened to stop the car 40 at the uppermost landing 45. After the car 40 has stopped at the upper landing, the contact members 76a may be closed to start the car in the "down" direction. Upon closure of the contact member 76a, the car 40 starts and accelerates in the downward direction in the same manner as heretofore described in the upward direction. As the car 40 moves downward, the contact members 67 of the inductor relay 63 momentarily close to initiate a clockwise notching operation of the floor selecting device M, each time the inductor relay 63 arrives at a position opposite an inductor plate 74 to 70.

It will be noted, in the apparatus described above, that during travel of the car in the upward direction, the shaft 1 is rotated counter-clockwise through the notching angle every time an inductor plate 70 to 74 is passed. As there are five of these plates, the shaft 1, counting terminal positions, successively assumes five plus one or six angular positions. During operation of the car in the downward direction the shaft 1 is rotated clockwise through the notching angle 5 times to its original position. It will therefore be seen that the shaft 1 is always in a particular angular position when the platform of the car 40 is in a particular region in the hatchway (designated a, b, c, d, e and f), regardless of the direction of travel of the car.

It will be understood that the direction switches 55 and 56 are controlled to start and stop the car at certain of the landings 41 to 45 depending upon calls registered at the landings or in the car. The apparatus for accomplishing these control operations as well as that for controlling the speed of the motor 49 has been omitted from Fig. 2 but has been shown in Fig. 3.

The apparatus shown in Fig. 3 comprises the hoisting drum 47, brake 50, elevator motor 49, generator 51 and driving motor 52 connected and disposed as in Fig. 2 but shown in somewhat more diagrammatic form. The manual switches 53 and 54, supply conductors L1 and L2, automatic switches 59 and 60, interlock relays 57 and 58 and direction switches 55 and 56, shown in Fig. 2, are also shown in Fig. 3. The contact arms 20, 21, 22, 23, 24, 25 and 26 and part of the shaft 1 of the floor selecting mechanism M has been shown in Fig. 3, but the apparatus for rotating the shaft 1, and such of the contact members of interlock relays 57 and 58 which cooperate therewith, have been omitted from Fig. 3.

In Fig. 3, a brake relay 80 is provided for controlling the circuits of the operating coils of inductor relays 6L and 1L and for establishing a circuit for the operating coils of the direction switches 55 and 56, independently of a time element relay 81, when the car is in operation. The function of the time element relay 81 is to prevent the re-starting of the car, after it has stopped at a landing, for a predetermined interval of time, sufficient to permit a door or gate to be opened. The time element relay 81 may be of any suitable type in which the contact members open immediately upon energization of the relay coil, but delay in re-closing upon deenergization of the relay coil. The time element feature may be introduced by means of a discharge resistor 81r, connected in parallel to the operating coil of the relay.

The release winding of the brake 50, together with the operating coils of the brake relay 80 and of the time element relay 81 are controlled by contact members of the direction switches 55 and 56.

An accelerating resistor 82, controlled by a speed relay 83 is provided for controlling the speed of motor 49. Although only one accelerating resistor and one speed relay are shown, it will be understood that in practice a much larger number may be used. The speed relay 83 is preferably a time element relay of the delayed opening type. This relay is provided with contact members which operate immediately upon energization and deenergization of its operating coil, and with other contact members, which will later be referred to in connection with Fig. 4, which open immediately upon energization of the relay coil but which are delayed in closing for a predetermined period of time after the relay coil is deenergized. Inasmuch as all of the contact members of the relay 83, which appear in Fig. 3, operate immediately upon energization and deenergization of the relay coil, the time element feature of the relay may be disregarded for purposes of this figure.

A door relay 84 is provided for preventing the starting of the car 40 unless all the doors and gates are closed and for preventing operating of the elevator car at any speed higher than low speed when the car gate is open. The door relay is controlled by door contact members 85 and gate contact members 86 in a well known manner.

A pair of relays 75 and 76, mentioned in connection with Fig. 2, are provided for completing the closing circuits of the operating coils of the direction switches 55 and 56. The relays 75 and 76 are controlled by a pair of starting relays 87 and 88, for starting the car in response to car calls and hall calls, respectively. A pair of stopping relays 89 and 90 are provided for initiating the stopping operations of the car 40 in response to car calls and to hall calls, respectively. Operator's flash signals 90a and 90b may be connected in parallel with the stopping relays 89 and 90, to indicate the approach of the car to a landing at which a hall or a car call has been registered, if the system is to be operated by an attendant.

The starting relay 87 and the stopping relay 89 for car calls are controlled by contact members of a bank of electromagnetically-held push button switches, shown diagrammatically at 91, 92, 93, 94 and 95, mounted in the car 40. The push button switches may be of any suitable type having contact members biased to open position, which are closed manually and which remain closed until the coil of the switch is deenergized. The push button switches mounted in the car correspond in number to the number of floors served by the car.

The starting relay 88 and the stopping relay 90 for hall calls, are controlled by a bank of floor relays 101, 102u, 102d, 103u and 103d. Although, for simplicity, I have shown only the relays for the first, second and third landings, it will be understood that two such relays are provided for each landing intermediate the uppermost and lowermost landings served by the elevator car, and one such relay is provided for each of the terminal landings. The relays 101, 102u, 102d 103u and 103d are controlled, in a manner to be hereinafter more fully described, by push buttons 1d, 2u, 2d, 3u and 3d mounted in the corridors adjacent the elevator shaft at the corresponding landing.

Each of the floor relays 101, 102u, etc., is provided with two coils wound in opposite directions, the upper one, in the figure, serving as a closing coil and the lower one as a demagnetizing coil. When the upper coil alone is energized, the relay closes its contact members. If, while the upper coil is energized, the lower coil also becomes energized, the relay drops out to open its contact members.

A resistor 104 is provided for preventing the closure of either direction switch 55 or 56 when any door or gate is open. The resistor 104 is of such resistance value that it passes a current of sufficient value to maintain either direction switch 55 or 56 closed, if it is already closed, but not of sufficient value to cause closure of either switch, if it is open.

A voltage responsive relay 131 is provided for preventing the closure of the speed relay 83 until the voltage of the generator 51 has built up to a predetermined value. The usual limit switches U. L. and D. L. are provided in the circuits of direction switches 55 and 56 and of speed relay 83, to open these circuits and stop the car at its upper and lower limits of travel. These limit switches are mechanically operated by cams (not shown) on the elevator car in the usual manner.

The operation of the apparatus shown in Fig. 3 may be set forth as follows: Preliminary to operation of the car 40 in response to operation of hall buttons 1d, 2u, 2d, etc., or the car buttons 91 to 95, the switches 53 and 54 are closed. As explained in connection with Fig. 2, the closure of the switch 53 causes the driving motor 52 and the generator 51 to accelerate to running speed. Upon closure of the switch 53, the supply conductors L1 and L2 become energized, and, as explained in connection with Fig. 2, circuits for the motor field winding 49f and for the "up" interlock relay 57 are completed, and the latter relay closes.

The operation of the car 40 may now be initiated in response to operation of the hall buttons 1d, 2u, 2d, etc., or the car buttons 91 to 95. Assuming that the car is standing at the first floor, that the first floor door and the car gate are open, that a prospective passenger has entered the car and pushed the button 95 corresponding to the fifth floor, the operation may be set forth as follows: As mentioned above, upon closure of switch 53, a circuit was completed for the "up" interlock relay 57 and the latter relay closed. This relay, in closing, partially completed a circuit for the relay 75, completed a circuit for the energizing coils of push button switches 91 to 95, partially completed various circuits through the floor selecting device M and opened its contact members in the circuit of the "down" interlock relay 58.

As, at the time the push button switch 95 was pushed by the prospective passenger, the coil of the latter switch was energized, the switch is magnetically held in after the pressure upon it is removed. The push button switch 95, in closing, establishes a circuit for the starting relay 87 and the latter relay closes.

The starting relay 87, in closing, completes a circuit for the relay 75. This circuit may be traced from the supply conductor L1, through the operating coil of the relay 75, through contact members of the "up" interlock relay 57 and contact members of the starting relay 87 to supply conductor L2.

The relay 75 accordingly closes to complete a circuit for the "up" direction switch 55; to partially complete a circuit for the speed relay 83, and to complete a holding circuit for itself through its contact member 75b.

The circuit for the operating coil of the "up" direction switch 55 may be traced from supply conductor L1, through contact members 1UL of the landing inductor relay 1L, contact members 75a of the relay 75, the operating coil of the "up" direction switch 55, back contact members of the speed relay 83, the resistor 104 and thence through the back contact members of the time element relay 81 to supply conductor L2.

The holding circuit for the relay 75, completed, as mentioned above, in response to closure of the latter relay, may be traced as follows:—from the supply conductor L1, through the operating coil of the relay 75, through contact members of the "up" interlock relay 57 and thence through contact members 75b of the relay 75 to the supply conductor L2.

Although the circuit for the "up" direction switch 55 is now completed, the latter switch does not close at this time, because of the presence of the resistor 104 in its circuit. As previously explained, the resistor 104 is of such resistance value that it does not pass sufficient current to cause closure of a direction switch.

If the elevator door, for the first floor, and the car gate are now closed, the contact members 85 and 86 are all closed to complete a circuit for the door relay 84. In response to completion of this circuit, the door relay 84 closes to short-circuit the resistor 104 in the circuit of the "up" direction switch 55, and to partially complete a circuit for the speed relay 83. The circuit of the speed relay 83 may be traced from the supply conductor L1, through contact members 6UL of the inductor relay 6L, through contact members of the relay 75, through the operating coil of speed relay 83, and thence through contact members of the door relay 84 to the supply conductor L2.

In response to the short-circuiting of the resistor 104, the "up" direction switch 55 closes to complete a circuit common to the release coil of the brake 50 and the operating coil of the relay 80; to connect the generator field 51f to the supply conductors L1 and L2, and to complete a circuit for the "up" interlock relay 57, independent of the automatic switch 60.

The brake relay 80 closes to complete a circuit for the time element relay 81 and to complete a circuit for the operating coils of the inductor relays 6L and 1L.

As mentioned above, upon closure of the door relay 84, a circuit for the speed relay 83 was partially completed. As the voltage of generator 51 builds up, it reaches a value sufficient to cause operation of the relay 131. The latter relay closes to complete the circuit of speed relay 83. Relay 83 now closes to short-circuit the accelerating resistor 82, in the circuit of the generator field winding 51f; to interrupt the branch of the circuit of the "up" direction switch 55 in which the resistor 104 is included; to break the circuit of the operating coil of the inductor relay 1L, to complete a circuit for the coil of relay 181, and to open its contact members 83b, for purposes which will hereinafter more fully appear.

In response to the short-circuiting of the accelerating resistor 82, the voltage of the generator 51 builds up further and the motor 49 accelerates to full speed.

If, at any time before the car 40 has reached a position in the hatchway such that the inductor relay 63 is opposite the inductor plate 70, a prospective passenger at the third landing desires to use the elevator car, he may push one of the push buttons 3u or 3d corresponding to the direction in which he desires to travel. Assuming that the propective passenger has pushed the button 3u corresponding to the "up" direction of travel, the operation is as follows: In response to closure of the push button 3u, a circuit for the upper or closing coil of the relay 103U is completed, and the latter relay closes. The relay 103U, in closing, completes a circuit for the starting relay 88, through its lower contact members, and completes a holding circuit for itself, independent of the push button 3u, through its upper contact members.

In response to completion of the circuit for the starting relay 88, the latter relay closes. The closure of this relay has no effect, at this time, as its contact members are shunted by the contact members of the starting relay 87, which latter relay is at this time closed.

As the car 40 continues upward, the floor selecting device M is notched counter-clockwise, each time the notching relay 63 passes one of the inductor plates 71 to 74.

As the car 40 enters the zone "c" shortly before reaching the second floor, a circuit for the stopping relay 90 is completed through contact member a and the contact arm 24 of the floor selecting mechanism M. In response to completion of this circuit, the stopping relay 90 closes to initiate an automatic stopping operation of the car 40 at the third landing, by completing a circuit for the operating coil of the inductor relay 6L. The contact members of the inductor relay 6L do not immediately open, however, as the magnetic circuit of the inductor relay is still incomplete.

As the car continues upward, the inductor relay 6L arrives at a position opposite the inductor plate 6U for the third floor. The magnetic circuit of the inductor relay 6L is now completed, and the contact members 6UL of the inductor relay open to interrupt the circuit of the speed switch 83 to thereby cause the latter switch to drop out. The speed relay 83, in dropping out, re-inserts the accelerating resistor 82 in the circuit of the generator field winding 51f; reestablishes the branch of the circuit of the operating coil of the "up" direction switch 55, in which the resistor 104 is included, completes a circuit for the operating coil of the inductor relay 1L, and closes its contact members 83b, preparatory to deenergization of the floor relay 103U in a manner to be hereinafter more fully explained.

When the car 40, in its continued upward movement, enters the zone d, approximately one-half floor height in advance of the third floor, a circuit for the lower or demagnetizing winding of the floor relay 103U is completed as follows,—from the supply conductor L1, through the upper contact members of the floor relay 103U, through the lower or demagnetizing coil of the relay 103U, through contact members d and the contact arm 22 of the floor selecting device M, through contact members of the "up" interlock relay 57 and thence through contact member 83b of the speed relay 83 to supply conductor L2.

In response to completion of this circuit, a flux is set up by the lower or demagnetizing coil of the relay 103U, in opposition to the flux set up by the upper or closing coil of the relay, and the relay 103U drops out.

It will be observed that, at the time contact members 83b start to reclose, in response to deenergization of the coil of relay 83, the arm 22 of the floor selecting device M is in engagement with the stationary contact member associated with the second floor. In order to prevent the cancellation, during slowdown for a third floor call, of a tardily registered second floor call, the reclosure of contact members 83b is delayed until after notching relay 63 passes the plate 72, between the second and third floors, at which time arm 22 of device M is moved into engagement with the stationary contact member d, associated with the third floor. In the illustrated embodiment, the delay is accomplished by means of a suitable dash pot 83c.

The reopening of the lower contact members of floor relay 103U interrupts the circuit for starting relay 88. The dropping out of this relay however, has no effect, since an independent circuit for the coil of relay 75 extends through the contact members b of the latter relay.

The reopening of the upper contact members of floor relay 103U interrupts the circuits for both the closing and demagnetizing coils thereof, and also interrupts the circuit for stopping relay 90. The deenergization of the two coils of floor relay 103U is without effect.

The deenergization of the coil of relay 90 interrupts the circuit for the coil of the inductor relay 6L, the contact members 6UL of which accordingly reclose to recomplete the circuit for the coil of speed relay 83 through resistor 181R. Recompletion of this circuit, however, does not actuate relay 83, since, while the current flowing therein is sufficient to maintain relay 83 in the actuated position, it is insufficient to independently actuate such relay. It will be recalled that the initial energizing circuit for relay 83 extends through the normally closed contact members of relay 181, which, after having been initially opened, remains in the open position until the car stops, a self-holding circuit being associated with the coil thereof.

Shortly before the car 40 arrives at the 3rd floor, inductor relay 1L arrives at a position opposite the inductor plate 1U. When this occurs, the magnetic circuit for the relay 1L is completed and this relay operates to open its contact members 1UL. Upon the opening of contact members 1UL, the circuit for "up" direction switch 55 is interrupted and the latter switch drops out. The "up" direction switch 55, in dropping out, interrupts the circuit common to the release winding of the brake 50, the operating coil of the time element relay 81 and the operating coil of the brake relay 80; disconnects the generator field winding 51f from the supply conductors L1 and L2, and opens its contact members in a circuit of the "up" interlock relay 57. As the circuit for the operating coil of the "up" interlock relay 57 is independently maintained through the automatic switch 59, the "up" interlock relay 57 remains energized. In response to the interruption of the circuit of the release winding of the brake 50, the brake is applied to bring the car 40 to rest at the third landing. At the same time, the brake relay 80 drops out to open its contact members in the circuit of the "up" direction switch 55 and to interrupt the circuits of the operating coils of the inductor relays 1L and 6L. The time element relay 81 does not immediately drop out however, because of the inductive discharge current which flows through the local circuit of its operating coil and the resistor 81r. At the expiration of a predetermined time interval, sufficient to permit a passenger to open a door or the car gate, the time element relay 81 drops out. Assuming that during this time interval, the prospective passenger at the third floor opens the door of the elevator hatchway at the third landing and the car gate and enters the car, the operation is as follows: Upon the opening of the elevator door, the corresponding contact members 85 are opened to break the circuit of the door relay 84. The door relay 84 drops out to prevent the re-starting of the car in response to the dropping out of the time element relay 81. The car cannot now be restarted until all of the elevator doors and the car gate are closed.

Assuming that the passenger who entered the car at the third floor now closes the elevator door and the car gate, the circuit for the door relay 84 is again completed, and the latter relay re-closes.

The door relay 84, in closing, again short-circuits the resistor 104 to cause the closure of the "up" direction switch 55 and completes a circuit for the speed relay 83. The car now accelerates to full speed in the "up" direction, in the manner previously described.

As the car enters the zone e approximately one-half floor height in advance of the fourth floor, (see Fig. 2) the floor selecting device M is rotated counter-clockwise to position e and a circuit for the stopping relay 89 is completed as follows;—from supply conductor L1 through the contact member e and the arm 20 of the floor selecting device M, through contact members of the "up" interlock relay 57 and the operating coil of relay 89 to supply conductor L2. The stopping relay 89 now operates to initiate an automatic stopping operation of the car 40 at the fifth landing, by completing a circuit for the operating coil of the inductor relay 6L. In response to completion of this circuit, the car 40 is brought to rest at the fifth floor in the manner described above in connection with the automatic stop at the third floor.

Shortly before the car 40 arrives at the fifth floor, the automatic switch 59 opens to interrupt the circuit of the "up" interlock relay 57, and the latter relay drops out to complete a circuit for the down interlock relay 58. During the interval between the interruption of the circuit of the "up" interlock relay 57 and the completion of the circuit of the down interlock relay 58, the circuit for the coils of the push button switches 91 to 95 is interrupted, and the push button switch 95 returns to its biased position interrupting the circuit for the starting relay 87. In response to interruption of the latter circuit, the starting relay 87 drops out.

The system is now in condition for operation of the car in the "down" direction in response to calls registered by the push button switches 91 to 95 in the car or the push buttons 3d, 2d, 1d, etc., in the corridors adjacent the corresponding floors.

Fig. 4 shows the signal control circuits of the elevator system shown in part in Figs. 2 and 3, and so much of the car control elements as directly cooperate with the signal control circuits. Referring to this figure, the apparatus shown therein comprises the elevator motor 49, the generator 51, the supply conductors L1 and L2, the interlock relays 57 and 58, the reversing switches 55 and 56, the automatic switches 59 and 60, the accelerating resistor 82, the speed relay 83 and the relays 75 and 76, connected and disposed as shown in Fig. 3. It will be understood that various parts of these elements, shown in Figs. 2 and 3, which do not directly cooperate with the signal circuits, have been omitted from Fig. 4.

A car position indicator, comprising a bank of lamps 110 corresponding in number to the number of landings served by the car 40, is mounted in the car. The bank of lamps 110 is controlled by contact members of the floor selecting device M.

A dispatcher's position indicator comprising a bank of lamps 111 is mounted at the dispatcher's station. The lamps 111 are controlled by contact members of the floor selecting device M and by contact members of the interlock relays 57 and 58, in a manner to be hereinafter more fully described.

A set of floor lanterns 112, is provided for indicating the approach of the car 40 to a landing for which a car call or a hall call has been registered. It will be understood that a pair of lanterns corresponding to the "up" and "down" direction, respectively, are mounted at each landing intermediate the upper and lower terminals. A single lantern is provided for the upper and for the lower terminal landings. The floor lanterns 112 are controlled by contact members of the floor selecting device M and by contact members of the interlock relays 57 and 58 and of the speed relay 83.

The lamps of the car position indicator are designated by roman numerals denoting the landings corresponding to the lamps. The lamps of the dispatcher's indicator 111 and floor lanterns 112 are designated by roman numerals to denote the landings corresponding to the lamps and by the letters "u" or "d" to denote the direction of car travel.

The operation of the apparatus shown in Fig. 4 may be set forth as follows: Assuming that the car is standing at the first floor, and that the generator 49 is running, the switch 53 may be closed to energize the supply conductors L1 and L2. Upon closure of the switch 53, a circuit for the operating coil of the "up" interlock relay 57 is completed in the manner described in connection with Fig. 2, and a circuit is completed for the first floor lamp I of the car position indicator 110. In response to completion of the circuit of its operating coil, the "up" interlock relay 57 closes to complete circuits for the lamp I$u$ of the dispatcher's position indicator 111 and for the floor lantern I.

If, now, a call for the third floor is registered, in the manner described in connection with Fig. 2, the relay 75 closes to complete a circuit for the "up" direction switch 55, and the car starts in the "up" direction. As the car moves upward, the floor selecting device M is notched in a counter-clockwise direction each time an inductor plate 70 to 74 is passed, in the manner described in connection with Fig. 2. Upon the starting of the car 40, in the "up" direction, the speed switch 83 closes in the manner described in connection with Fig. 2, breaking the circuit for the hall lanterns.

When the floor selecting device M is notched to position $b$, the circuit to the lamp I of the car position indicator is broken, the circuit for the lamp I$u$ of the dispatcher's position indicator 111 is broken and a circuit for the lamp II$u$ of the dispatcher's indicator is completed.

When the floor selecting device M is notched to position $c$, a circuit for the lamp II of the car position indicator 110 is completed, and the lamp II$u$ of the dispatcher's position indicator remains energized through the contact members of the floor selecting device. The car is now in the region $c$, (see Fig. 2) extending above and below the second floor.

At about the time the car passes the second floor, the stopping operation for the third floor is initiated by the inductor relay 6L, independently of the floor selecting device M, as described in connection with Fig. 2. Upon operation of the inductor relay 6L, the speed switch 83 commences to operate to open position, under control of its time delay device. The contact members of the speed switch 83 controlling the resistor 82, immediately open to slow down the car. The contact members 83$a$, controlling the floor lanterns, remain open for a predetermined time interval sufficient for the car to cover the distance remaining before the floor selecting device M is notched to position $d$, and close at the expiration of this interval.

When the floor selecting device M is notched to position $d$, the circuits for the lamps II of the car position indicator 110 and II$u$ of the dispatcher's position indicator 111 are broken, and circuits for the lamp III of the car position indicator 110, for the lamp III$u$ of the dispatcher's indicator 111 and for the hall lantern III$u$ are completed. The car is now entering the region $d$ extending above and below the third landing. The car is stopped at the third floor in the manner described in connection with Fig. 2. The operation of the signal control circuits for operation of the car in either direction between other limits than the first and third floors will be apparent from the above.

Figure 5:
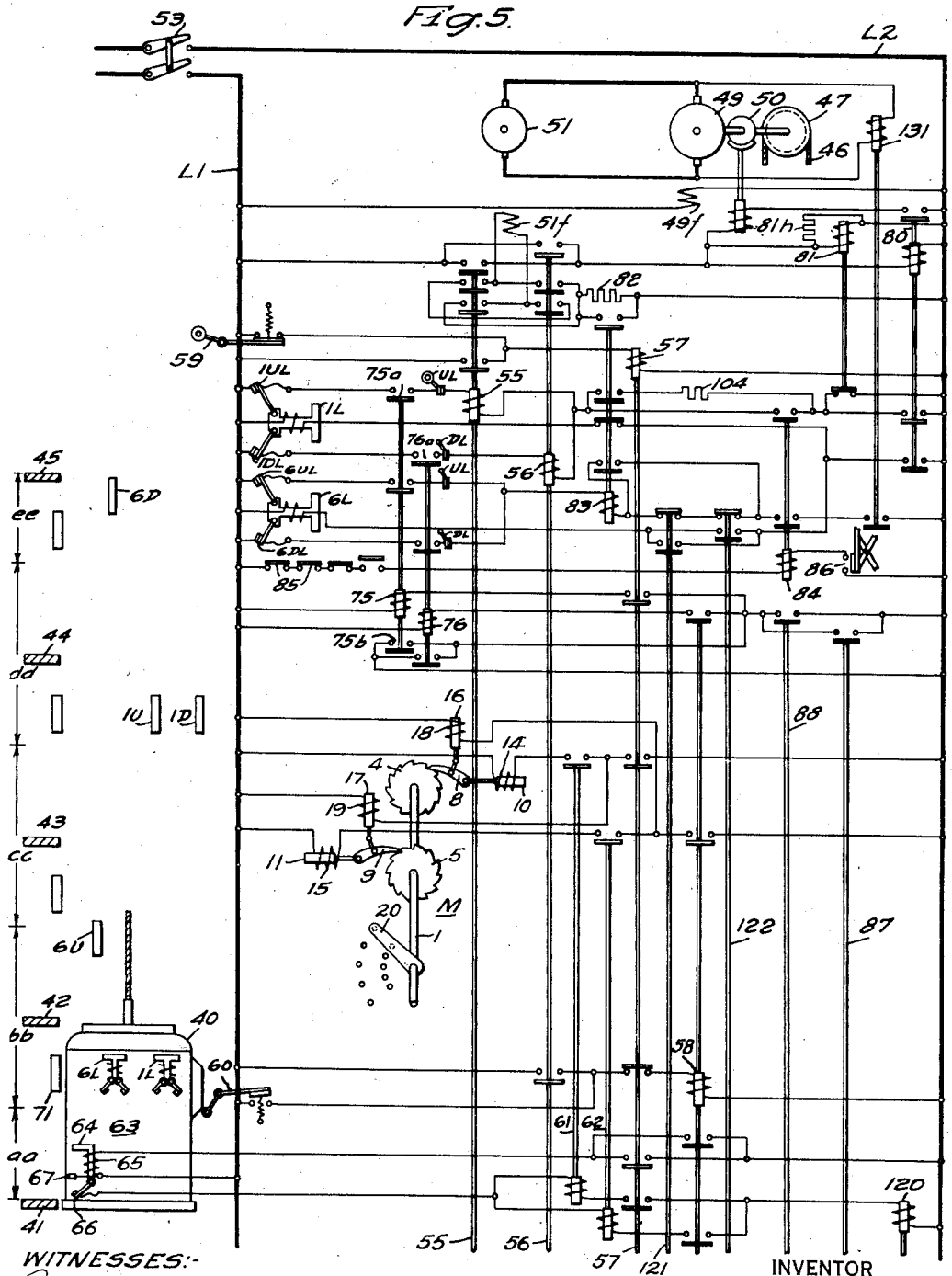
Figure 6:
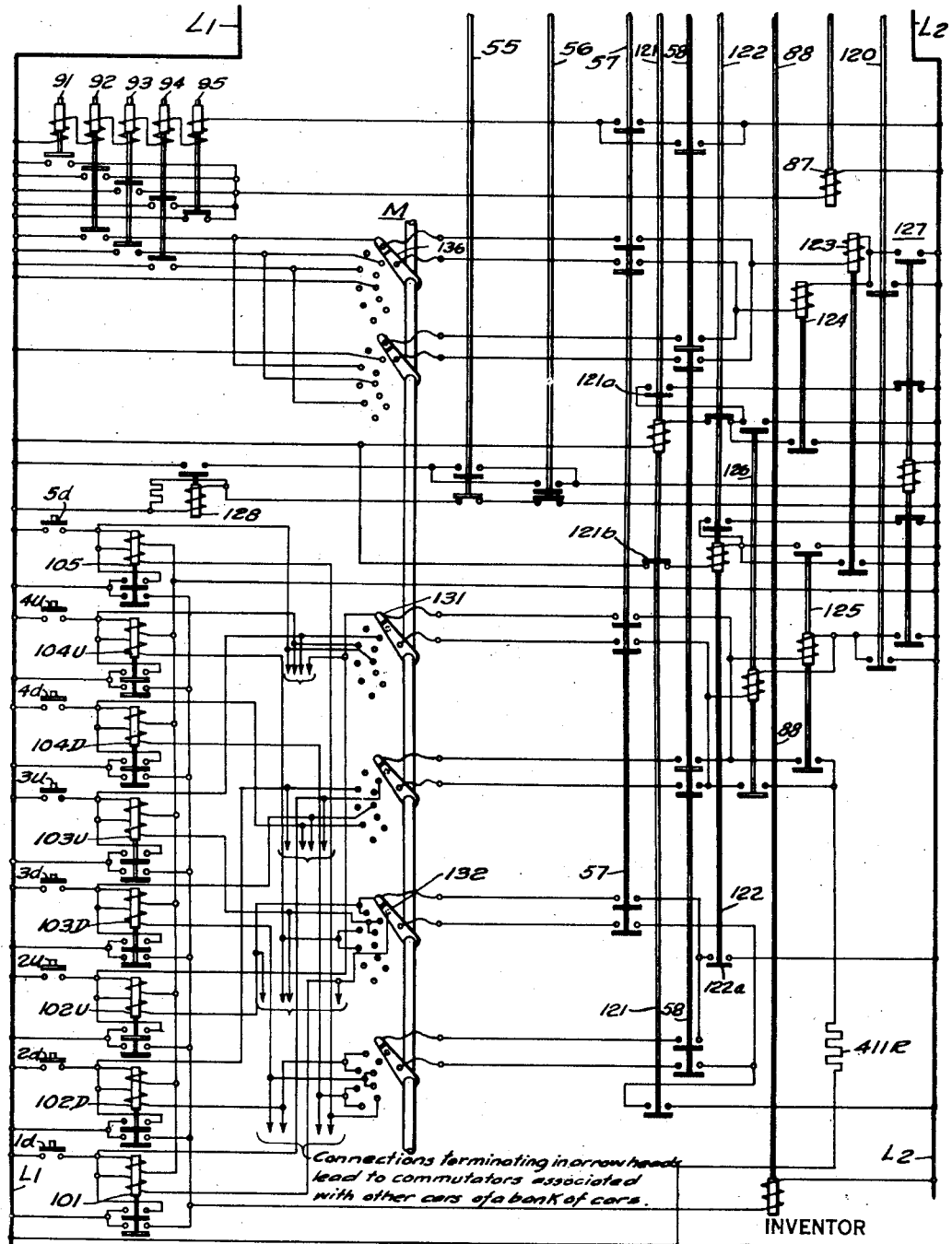

In Figs. 5 to 7, I have illustrated a modification of my invention in which a call for any floor may be registered at any time except when the car is standing at the floor, although the slow-down distance exceeds the distance between floors, and the slow-down zone for one floor overlaps the cancellation zone for other floors. In the modification illustrated in Figs. 5 to 7, also, the floor lanterns are lighted when the car is 1½ floors in advance of a landing at which the car is to stop, rather than ½ floor, as in the system shown in Figs. 2 to 4. The 1½ floor lighting interval is preferable for car speeds of 600 feet per minute and upward.

Referring to Fig. 5, the apparatus shown therein comprises various elements and circuits which will be readily identified with the corresponding parts bearing the same reference characters in Figs. 2 and 3. The circuits shown in Fig. 5 are identical with the corresponding ones of Figs. 2 and 3, except that stopping relays 121 and 122 are substituted for the stopping relays 89 and 90 of Fig. 3, and that a relay 120, for which there is no equivalent in Figs. 2 and 3, is shown. Contact members of stopping relays 121 and 122 are included in the circuit of speed switch 83. The operating coil of the relay 120 is connected in a circuit common to the coils of notching relays 61 and 62. The relay 120, therefore, closes momentarily every time the inductor relay 63 arrives at a position opposite an inductor plate.

The system shown in Fig. 5 also differs from that of Figs. 2 to 4 in that a single inductor plate 71 is provided between the first and second floors, rather than two inductor plates, as in Fig. 2.

The operation of the apparatus shown in Fig. 5 is similar to the operation of the corresponding apparatus in Figs. 2 to 4, previously described. Upon closure of the manual switch 53 (and the door and gate contact members 85 and 86, respectively), the interlock relay 57 closes to establish an "up" direction set-up. Upon closure of the door and gate contact members 85 and 86, recpectively, the car may now be started in the "up" direction, in response to closure of either starting relay 87 or 88. Upon closure of either stopping relay 121 or 122, the car is stopped automatically at a succeeding landing by the inductor relays 6L and 1L, in the manner described in connection with Fig. 3. Every time the inductor relay 63 passes an inductor plate, the floor selecting mechanism M is notched counter-clockwise (for upward travel) one notch, and the relay 120 momentarily closes. When the car reaches its upper limit of travel, the "up" interlock relay 57 opens and the "down" interlock relay 58 closes to establish a "down" direction set-up, in the manner described in connection with Fig. 2.

Referring now to Fig. 6, which shows the apparatus for registering and cancelling calls, a set of electromagnetically held push button switches 91 to 95 is mounted in the car and connected to the starting relay 87 in the manner shown in Fig. 3 and described in connection therewith.

A set of floor relays 101, 102U, 102D, 103U, 103D, 104U, 104D and 105 is provided, as in Fig. 3; the entire set, however, being shown in Fig. 6. These floor relays are controlled by push buttons 1$u$, 2$u$, 2$d$, 3$u$, 3$d$, 4$u$, 4$d$, 5$d$, mounted at the landings, and control the starting relay 88 in the manner described in connection with Fig. 3.

A pair of car call relays 123 and 124 and a pair of hall call relays 125 and 126 are provided for jointly controlling the stopping relays 121 and 122, in conjunction with a relay 127. The relay 127 is controlled by means of contact members of the direction switches 55 and 56 and contact members of a time element relay 128 in such a manner that it closes momentarily every time the car starts.

The operation of the apparatus shown in Fig. 6 may be set forth as follows: Assuming that the elevator car is at the first floor, that the supply conductors L1 and L2 are energized and that the car gate and hatchway doors are closed, the car may be started in response to operation of the car push button switches 91 to 95 or of the floor push buttons 1u, 2u, 2d, 3u, etc. Upon energization of the supply conductors L1 and L2, a circuit for the time element relay 128 is completed and the latter relay closes to partially complete a circuit for the relay 127. The "up" interlock relay 57 also closes in the manner described in connection with Fig. 2.

If the push buttons 3u and 4u are now pressed, the push button 3u completes a circuit for the floor relay 103U, and the latter relay closes to complete a holding circuit for itself and a circuit for the starting relay 88, in the manner described in connection with Fig. 3. The push button 4u completes a similar circuit for the floor relay 104U and the latter relay closes. The starting relay 88 closes to initiate the proper operations to close the direction switch 55 and to start the car upward, in the manner described in connection with Fig. 3.

Upon closure of the direction switch 55, the circuit of the time element relay 128 is interrupted and the circuit of the relay 127 is completed. The time element relay 128 does not immediately drop out, however, as the inductive discharge of the relay coil through its associated resistor maintains the relay closed for a short interval of time. During this interval, the relay 127 closes. At the expiration of the time interval of relay 128, the latter relay drops out to break the circuit of the relay 127. The relay 127 accordingly drops out, having been closed only momentarily.

During the interval while the relay 127 is closed, it partially completes a circuit for the car call relays 123 and 124; opens contact members in the holding circuit of stopping relay 121; opens contact members in the holding circuit of stopping relay 122, and partially completes a circuit for the hall call relays 125 and 126. If at this time the circuit of any of the car call relays 123 or 124 or of the hall call relays 125 or 126 is otherwise complete, the corresponding relay will close. Otherwise, the car call relays 123 and 124 and the hall call relays 125 and 126 will all remain open. Tracing the connections through, it may be seen that no circuit for any of the relays 123 to 126 is completed.

As the car proceeds upward, it leaves zone aa and enters zone bb. The floor selecting mechanism M is now notched counter-clockwise one notch in the manner described in connection with Fig. 2, and the relay 120 momentarily closes. The latter relay, in closing, partially completes circuits for the car call relays 123 and 124 and the floor call relays 125 and 126 in the same manner as the relay 127. Tracing the connections through, it may be seen that a circuit for the hall call relay 126 is now completed, but that no circuit is completed for the relays 123, 124 or 125. The circuit of the hall call relay 126 may be traced from supply conductor L2, through the lowermost contact members of relay 120, the coil of floor call relay 126, contact members of "up" interlock relay 57, contact arm 131 of the floor selecting mechanism M and the upper contact members of floor relay 103U to supply conductor L1.

The hall call relay 126 closes to complete a circuit for the stopping relay 121, and the latter relay closes. The stopping relay 121, in closing, prepares the circuits of the control system for an automatic stop in response to operation of inductor relays 6L and 1L; completes a holding circuit for itself through contact members 121a; opens the circuit of stopping relay 122, and completes a cancellation circuit for the floor relay 103U. The latter circuit may be traced from supply conductor L2, through the lowermost contact members of stopping relay 121, the lowermost contact members of "up" interlock relay 57, the contact arm 132, and the lower de-magnetizing coil of floor relay 103U to supply conductor L1. The floor relay 103U now drops out.

It is to be noted that the cancellation circuit for floor relay 103U is closed, at the contacts of floor selecting device M, throughout the interval that car 40 is traversing zones bb and cc, since cancellation contacts of device M are connected together in groups of twos. With this arrangement, repeated operations of floor button 3u, after the call has initially been cancelled, and before car 40 restarts from the third floor, have only the effect of energizing both the main and de-magnetizing coils of floor relay 103U. Since both coils are, under these conditions, energized simultaneously, floor relay 103U is not actuated, and such repeated operations of floor button 3u do not have the effect of registering another, and false, call for the third floor.

The car is now in zone bb, moving upward. It will be recalled that this zone extends one-half floor height above and below the second floor. If, while the car is in zone bb, the push button 2u is pressed, a circuit for the floor relay 102U is completed and the latter relay closes. The circuit for the lower de-magnetizing coil of floor relay 102U is open at contact members 122a of the stopping relay 122, so that the relay 102U remains closed, and the call stays registered until the car returns to the first floor and starts upward on a second trip, as will be hereinafter more fully described.

Returning to Fig. 6, upon closure of the stopping relay 121 when the car enters zone bb, the circuit of the coil of inductor relay 6L (Fig. 5) is completed. When the inductor relay 6L arrives at a position opposite the inductor plate 6U for the third floor, slow-down is initiated for the third floor. The inductor plate 6U may be positioned so that almost the entire distance of 1½ floors is available for slow-down.

While the car is slowing down for the third floor, it leaves zone bb and enters zone cc. The floor selecting mechanism M is now notched counter-clockwise to its third position and the relay 120 momentarily closes, in the manner previously described. The momentary closure of relay 120 completes a circuit for the hall call relay 125, and the latter relay momentarily closes, in the manner heretofore described in connection with the hall call relay 126.

The closure of relay 125 is not effective, at this time, to complete the circuit of the stopping relay 122, however, as the latter circuit is open at contact members 121b of stopping relay 121. The stopping relay 122, accordingly, remains open, preventing the completion of a circuit to the de-magnetizing coil of floor relay 104U, which would otherwise be completed through contact members 122a.

The car continues to travel upward at slow speed until it is automatically stopped at the third floor, in the manner described in connection with Fig. 3. When the car stops, the direction switch 55 drops out to complete the circuit of time element relay 128. The time element relay 128 immediately recloses to partially complete the circuit of the relay 127. It will be noted that the connection of a resistor in parallel to the coil of relay 128 is effective to delay the relay in opening, but not in closing.

After the door and gate have been opened to permit the entry of a passenger and reclosed, or at the expiration of a predetermined interval of time, the direction switch 55 recloses and the car re-starts upward, as described in connection with Fig. 3.

Upon the reclosure of direction switch 55, the relay 127 again closes momentarily, to partially complete circuits for the car call relays 123 and 124; to break the holding circuit of stopping relay 121; to open contact members in the holding circuit of stopping relay 122 and to partially complete a circuit for the hall call relays 125 and 126.

In response to interruption of its holding circuit, the stopping relay 121 drops out. The relay 125 again closes and is now effective to complete the circuit of stopping relay 122. This circuit may be traced from supply conductor L2, through contact members of relay 125, the coil of stopping relay 122 and contact members 121b of stopping relay 121 to supply conductor L1.

The stopping relay 122 now closes to open contact members in the circuit of speed switch 83 (see Fig. 5); to open the circuit of stopping relay 121 (Fig. 6); to complete a holding circuit for itself and to complete a circuit for the de-magnetizing coil of floor relay 104U. The latter circuit may be traced from supply conductor L2, through contact members 122a of stopping relay 122, contact members of "up" interlock relay 57, the contact arm 132 (now in its third position), thence through the de-magnetizing coil of floor relay 104U and the upper contact members of floor relay 104U to supply conductor L1. The floor relay 104U accordingly drops out, cancelling the fourth floor call.

The dropping out of floor relay 104U does not cause relay 125 to drop out, however, as a self-holding circuit therefor extends, in series with a resistor 411R, through the lower contact members thereof.

It should be noted that the value of resistor 411R is such that the current traversing the associated circuit is sufficient to maintain relay 125 in the actuated position, but is insufficient to actuate this relay. Accordingly, relay 125, and the corresponding relay 126, can be initially actuated only through circuits which extend through contact members of the floor relays.

The above traced holding circuit for relay 125 is maintained until the lower contact members of relay 127 resume the open position, which, as hereinbefore described, occurs at the expiration of the time interval determined by relay 128. The opening of these contact members of relay 127, however, is preceded by the closing of a normally closed set of contact members, also associated with relay 127, and which are included in a self-holding circuit for relay 122. It will be observed, therefore, that though the initial energizing circuit for the coil of relay 122 is interrupted in the course of the starting operation, this relay is maintained energized until the car restarts from the fourth floor, at which time the self-holding circuit therefor is interrupted at the contact members of relay 127.

Resistor 411R is not required in a system involving only one car, since the above traced holding circuits for relays 125 and 126 extend through contact members controlled by these relays, respectively. In systems involving more than one elevator car, however, the floor selecting circuits associated with the several cars are connected in parallel, in a manner to be more fully described hereinafter. In systems of this character, resistor 411R is necessary to prevent the corresponding relay, 125 or 126, of a closely following car from being energized through the self-holding circuit of the corresponding relay, 125 or 126, associated with a leading car. This operation, which would only occur in the event that the second car was following very closely behind the first, is prevented by resistor 411R, which, as noted above, permits the passage of insufficient current to actuate either relay 125 or 126.

Returning to Fig. 5, it will be seen that upon increase of the voltage of generator 51 sufficient to cause closure of the voltage responsive relay 131, the latter will not be effective to complete the circuit of the speed switch 83, as this circuit is open at contact members of stopping relay 122. The car, accordingly, proceeds upward at low speed until the inductor relay 1L arrives at a position opposite the inductor plate 1U for the fourth floor. The car is now automatically stopped at the fourth floor.

Although the floor relays 103U and 104U are now deenergized, the circuit of starting relay 88 is still complete through the lower contact members of the floor relay 102U.

After the call at the fourth floor has been answered, the car re-starts upward, and is stopped at the upper limit by the upper limit switches UL. The "up" interlock relay 57 opens and the "down" interlock relay 58 closes in the manner described in connection wtih Fig. 2. The car now starts downward, accelerates to full speed, and is stopped at the lower limit by the lower limit switches DL. As the starting relay 88 is still closed, the car re-starts upward and answers the "up" call for the second floor. The floor relay 102U is deenergized in the manner previously described in connection wtih floor relays 103U and 104U and the starting relay 88 drops out. The car now remains at the second floor until further calls are registered.

In the operation described above, it will be noted that, after the stopping operation for the third floor has commenced, a call for the second floor is not effective to change the stopping operation already set up, although the car had not yet reached the second floor. It will also be noted that the call for the second floor is not canceled until it has been answered, and that a call for the fourth floor is not canceled when the car entered the normal slow-down zone (1½ floors) for the fourth floor, while the car was slowing down for the stop at the third floor. The call for the fourth floor is answered only when the car has started from the third floor to answer the call of the fourth floor.

In describing the operation of the system shown in Figs. 5 and 6, reference has been made to the use of only a single car in the elevator system. The arrangement shown in Figs. 5 and 6 is, however, particularly well adapted for use in systems involving a bank of cars.

In present day systems for controlling a plurality of cars, it is customary to so arrange the floor selecting circuits that a single series of "up" and "down" push buttons, located at the several floors, are effective to cause the stopping of any of the cars of the bank. It is usual in the art to so arrange the call-cancellation circuits that the call is canceled at the time the first car to approach the associated floor initiates a slow-down operation in response to the call. Systems arranged in this way are identified in the art as "selective" systems, for the reason that the stopping of more than one car in response to the same call is prevented.

A typical system for controlling a bank of cars is shown and described in reissue application Serial No. 529,535, filed April 11, 1931, by Edgar M. Bouton and assigned to the Westinghouse Electric and Manufacturing Company. As shown in the Bouton application, the car-stopping and call-cancellation circuits which originate at the several floor relays extend, in parallel, to the individual floor selectors associated with the several cars which form the bank. Returning to Fig. 6, of the present application, it is to be noted that branch circuits, which terminate in arrow heads, are shown as connected in parallel to the circuits which lead from the floor relay contact members to the floor selecting devices which control relays 125 and 126, and that similar branch circuits, also terminating in arrow heads, are shown as connected in parallel with the floor selecting devices which control the cancellation circuits of the several floor relays. As indicated in the legend at the bottom of Fig. 6, the connections, which terminate in arrow heads, lead to the floor selecting devices associated with other cars of a bank of cars.

In accordance with the arrangement shown in the above-identified Bouton application, in adapting the systems shown in Figs. 5 and 6 of the present application for use in connection with a bank of cars, all of the apparatus, with the exception of the hall push buttons and floor relays, would be duplicated for each car of the bank. It is seen, therefore, that the circuits shown in Fig. 6 as terminating in arrow heads, if completed, would extend through the floor-selecting devices to complete the stopping and cancellation circuits in exactly the manner described in connection with the corresponding circuits which are completely illustrated in Fig. 6. Under these circumstances, it is believed unnecessary to further show or describe these circuits.

The arrangement shown in Figs. 5 and 6, when embodied in a system comprising a plurality of cars, is particularly advantageous in that, in addition to providing the "selective" feature discussed hereinbefore, the system inherently provides a "selective" zone which may extend in advance of a floor a distance either equal to or greater than the distance required to bring the elevator car from full speed to rest. As described in connection with Figs. 5 and 6, as the elevator car approaches a floor for which a call is registered, either relay 125 or 126 is actuated to perform two functions. These functions are, first, to complete a circuit for the cancellation call associated with the particular floor relay, and, second, to complete a circuit for a stopping relay, 122 or 121. Stated in another way, relays 125 and 126 serve to cancel the call, thus preventing a second car from receiving the same call, and to transfer the call from the floor relay circuits to the stopping circuits of the individual car.

The "selective" zone of the car, accordingly, is determined by the point in advance of the floor at which relay 125 or 126 is actuated. The stopping zone for the car is determined by the point in advance of the car at which the high-speed inductor relay 6L is actuated. The stopping relays 121 and 122 (which control high-speed inductor relay 6L), after having been initially actuated by relays 126 and 125, respectively, remain in the actuated position until the car restarts from the floor. Accordingly, by properly locating the inductor plates associated with inductor relay 6L with respect to the point at which relays 125 and 126 are actuated, the slow-down zone may be made substantially equal to, or considerably less than the "selective" zone.

Fig. 7 shows the apparatus for controlling the floor lanterns of the system shown in Figs. 5 and 6. It will be understood that other signal circuits, such as those for a car position indicator and a dispatcher's position indicator are provided in the system shown in Figs. 5 to 7, but inasmuch as these circuits are substantially the same as the corresponding ones shown in Fig. 4, they have been omitted for simplicity.

Referring to Fig. 7, a bank of floor lanterns are connected through two rows of stationary contact members of the floor selecting mechanism M, contact members of the "up" and "down" interlock relays 57 and 58, and contact members of the stopping relays 121 and 122 to supply conductors L1 and L2.

The operation of the apparatus shown in Fig. 7 may be set forth as follows: When the car is travelling upward, the "up" interlock relay 57 is closed. If calls are registered at the third or fifth floors, the stopping relay 121 closes when the car is 1½ floors in advance of the floor at which the call is registered. Assuming that a call is registered at the third floor, the stopping relay 121 closes when the car enters zone $bb$. This completes a circuit for the hall lantern IIIu, which may be traced from the supply conductor L2, through contact members of stopping relay 121, the lower contact members of "up" interlock relay 57, the contact arm 134 and hall lantern IIIu to supply conductor L1. The hall lantern IIIu, accordingly, lights and remains lit after the car stops, until the car re-starts from the third floor. When the car re-starts from the third floor, the stopping relay 121 drops out in the manner described in connection with Fig. 6, and the circuit of hall lantern IIIu is broken.

If calls are registered for the even floors (second or fourth), the stopping relay 122 closes when the car is 1½ floors in advance of the floor, completing a circuit for the corresponding floor lantern IIu or IVu.

If calls for successive floors, such as the third and fourth are registered, the stopping relay 121 closes when the car is 1½ floors below the third floor and completes a circuit for the floor lantern IIIu. The latter circuit is broken when the car re-starts from the third floor. At this time, the stopping relay 122 closes for the stop at the fourth floor, and a circuit for floor lantern IVu is completed. The latter circuit is maintained until the car re-starts from the fourth floor.

Operation of the floor lanterns when the car is travelling downward is similar to that described above for upward travel and will be readily understood.

Fig. 8 shows apparatus additional to that shown in Fig. 6, by means of which the car may be operated at express speeds higher than the full operating speed of the system shown in Figs. 5 to 7.

Referring to Fig. 8, the car call relays 124 and 125 and the hall call relays 125 and 126 and their associated circuits are shown as in Fig. 6, except that the car push button switches 91 to 95 and the floor relays 101, 102U, etc., are omitted for simplicity. The contact arms of the floor selecting mechanism M associated with the relays 123 to 126 are provided with insulated advance contact members 131a, 136a, spaced in advance of the contact arm to engage the next stationary contact members to those engaged by the arm itself.

The advance contact members 131a, 136a, etc., are connected to control a pair of relays 141 and 142. An express stop relay 143, controlled by the relays 141 and 142 is provided for interrupting, or for preventing the establishment of, express speed connections, as will be hereinafter more fully explained.

A time element relay 144 is provided for interrupting the circuits of stopping relays 121 and 122, heretofore described in connection with Fig. 6. The time element relay 144, closes without time delay, but is delayed in opening for a time interval slightly longer than the interval that relay 120 is closed. It will be recalled that relay 120 closes for a short interval of time, every time the floor selecting mechanism M operates.

A voltage responsive relay 145 is provided for preventing the establishment of express speed connections until shortly before the car comes to the high speed referred to in connection with Fig. 6.

A field resistor 146 is provided in the circuit of the motor field winding 49f, to reduce the excitation of the motor 49 and to thereby increase its speed to express value. The field resistor 146 is controlled by a field relay 147.

The operation of the apparatus shown in Fig. 8 may be set forth as follows: As soon as the supply conductors L1 and L2 are energized, a circuit for the field relay 147 is completed and the latter relay closes to short-circuit the field resistor 146, thereby fully energizing the motor field.

Assuming that the car has been started upward, in the manner described in connection with Figs. 3 and 6, the floor selecting mechanism M is notched counter-clockwise each time the inductor relay 63 passes an inductor plate.

If there are no calls registered for floors within a space of 2½ floors in advance of the car, the voltage responsive relay 145 operates shortly before the car reaches high speed, to interrupt the circuit of field relay 147 and to complete a circuit for the time element relay 144. The field relay 147 opens to insert the resistor 146 in the field circuit of motor 49 and to thereby increase the speed of the car to express speed, and the time element relay 144 operates to open its contact members.

The car continues at express speed until it reaches a point 2½ floors in advance of a floor at which a call is registered. When this occurs, a circuit for one of the relays 141 or 142 is completed through the corresponding advance contact member (136a for example) and the relay closes. Assuming that relay 141 has closed, it completes a circuit for express stop relay 143. Express stop relay 143 closes to complete a circuit for field relay 147 and to break the circuit of time element relay 144.

In response to completion of its circuit, the field relay 147 closes to short-circuit the field resistor 146 and to reduce the car speed to high speed value.

The time element relay 144 delays in opening for a sufficient time interval to permit the dropping out of relay 120 after its momentary closure at the 2½ floor point and then drops out.

The car now continues at high speed to a point 1½ floors in advance of the floor for which the call is registered. At this point, an automatic stopping operation, as described in connection with Fig. 6, is initiated and the car is brought to rest at the floor for which a call was registered.

When the direction switch 55 opens, in completing the stopping operation, described in connection with Fig. 3, it interrupts the circuit of express stop relay 143, restoring the apparatus to its initial condition.

If, at the time the car starts, a call for a floor within 2½ floors in advance of the car exists, one of the relays 141 or 142 immediately closes to complete a circuit for the express stop relay 143, thereby preventing the establishment of express speed connections. The car now automatically stops at the landing for which a call is registered, in the manner described in connection with Fig. 6.

It will be understood that many devices known in the art, which would be used in an actual elevator installation embodying my invention, have been omitted for simplicity.

Although I have shown a single floor selecting device for controlling all of the circuits of the system it will be understood that in practice a number of such devices may be used in order to reduce the wiring of the system. It will also be understood that my novel floor selecting device may be used in elevator systems of a different type from that disclosed, and that the structure of the floor selecting mechanism may be modified in various ways.

I do not, therefore, intend that the present invention shall be restricted to the specific structural details, arrangement of parts or circuit connections herein set forth, as various modifications thereof may be effected without departing from the spirit and scope of my invention. I desire that only such limitations shall be imposed as are indicated in the appended claims.

I claim as my invention:

1. In an elevator system, an elevator car operable in a hatchway; a floor selecting mechanism comprising a movable element, means operable upon repeated actuation to move said movable element step by step, means for determining the direction of movement of said movable element, and contact members controlled by said movable element; means comprising a switch carried on said car and cooperating elements mounted on said hatchway responsive to the position of said car in said hatchway for actuating said first mentioned means when said car is in any of a plurality of predetermined positions; means for determining the direction of movement of said car; and means for simultaneously controlling said means for determining the direction of movement of said movable element and said means for determining the direction of movement of said car.

2. In an elevator control system, an elevator car operable in a hatchway past a plurality of landings; a stationary control element comprising a plurality of contacts; a movable element mounted to assume a plurality of circuit controlling positions with reference to said contacts; means operable upon repeated actuation to move said movable element step by step to each of said positions; means comprising a switch carried on said car and cooperating elements mounted on said hatchway responsive to the position of said car in said hatchway for actuating said first mentioned means when said car is in each of a plurality of predetermined positions in said hatchway; and means responsive to said stationary and movable elements for initiating an automatic stopping operation of said car at any of said landings.

3. In an elevator control system, an elevator car operable in a hatchway past a plurality of landings; a plurality of control means corresponding to said landings, for registering calls for said car; manually operable means for initiating operation of said control means; retaining means for retaining each of said control means in operated condition after operation thereof in response to said manually operable means; a stationary control element comprising a plurality of contacts; a movable element, mounted to assume a plurality of circuit controlling positions with reference to said contacts; motive means, operable upon repeated actuation to move said movable element step by step to each of said positions; means comprising a switch carried on said car and cooperating elements mounted on said hatchway responsive to the position of said car in said hatchway for actuating said motive means when said car is in each of a plurality of positions in said hatchway; and means controlled by said movable element for rendering each of said retaining means ineffective when the car is in a predetermined position with reference to the corresponding landing.

4. In an elevator control system, an elevator car operable in a hatchway past a plurality of landings; a plurality of control means corresponding to said landings; manually operable means for initiating operation of said control means; retaining means for retaining each of said control means in operated condition after operation thereof in response to said manually operable means; means responsive to operation of any of said control means for moving said car toward the corresponding landing; a stationary control element comprising a plurality of contacts; a movable element mounted to assume a plurality of circuit controlling positions with reference to said contacts; motive means operable upon repeated actuation to move said movable element step by step to each of said positions; means comprising a switch carried on said car and cooperating elements mounted on said hatchway responsive to the position of said car in said hatchway for actuating said motive means when said car is in each of a plurality of predetermined positions in said hatchway; and means controlled by said movable element for rendering each of said retaining means ineffective when said car is in a predetermined position with reference to the corresponding landing.

5. In an elevator control system, an elevator car operable in a hatchway past a plurality of landings; a plurality of control means corresponding to said landings; manually operable means for initiating operation of said control means; retaining means for retaining each of said control means in operated condition after operation thereof in response to said manually operable means; means responsive to operation of any of said control means for moving said car toward a corresponding landing; a stationary control element comprising a plurality of contacts; a movable element, mounted to assume a plurality of circuit controlling positions with reference to said contacts; motive means operable upon repeated actuation to move said movable element step by step to each of said positions; means comprising a switch carried on said car and cooperating elements mounted on said hatchway responsive to the position of said car in said hatchway for actuating said motive means when said car is in each of a plurality of predetermined positions in said hatchway; and means controlled by said movable element for initiating a stopping operation of said car when said car is in a predetermined position in advance of a landing corresponding to an operated control means and for rendering the retaining means for said operated control means ineffective when said car is in a predetermined position with reference to a landing corresponding to an operated control means.

6. In an elevator control system, an elevator car operable in a hatchway past a plurality of landings; a plurality of control means corresponding to said landings; manually operable means for initiating operation of said control means; retaining means for retaining each of said control means in operated condition after operation thereof in response to said manually operable means; means responsive to operation of any of said control means for moving said car toward a corresponding landing; a stationary control element comprising a plurality of contacts; a movable element, mounted to assume a plurality of circuit controlling positions with reference to said contacts; motive means operable upon repeated actuation to move said movable element step by step to each of said positions; means comprising a switch carried on said car and cooperating elements mounted on said hatchway responsive to the position of said car in said hatchway for actuating said motive means when said car is in each of a plurality of predetermined positions in said hatchway; means controlled by said movable element for initiating a stopping operation of said car when said car is in a predetermined position in advance of a landing corresponding to an operated control means; and means controlled by said movable element for rendering the retaining means for said operated control means ineffective when said car is in a different predetermined position with reference to a landing corresponding to an operated control means.

7. In an elevator control system, an elevator car operable in a hatchway past a plurality of landings, motive means for said car; deceleration means for controlling said motive means to decelerate and stop said car at a landing in a predetermined stopping distance greater than the distance between consecutive landings; a plurality of control means corresponding to said landings for initiating operation of said deceleration means to bring said car to rest at a corresponding landing; and means effective after one of said control means has initiated operation of said deceleration means, to prevent any other of said control means from affecting said deceleration means, until said operation is completed.

8. In an elevator control system, an elevator car operable in a hatchway past a plurality of landings; motive means for said car; deceleration means for controlling said motive means to decelerate and stop said car at a landing in a predetermined stopping distance greater than the distance between consecutive landings; a plurality of control means corresponding to said landings for initiating operation of said deceleration means to bring said car to rest at a corresponding landing; means effective after one of said control means has initiated operation of said deceleration means, to prevent any other of said control means from affecting said deceleration means until said operation is completed; and means effective upon re-starting of said car for rendering said last-mentioned means ineffective.

9. In an elevator control system, an elevator car operable in a hatchway past a plurality of landings; motive means for said car; deceleration means for controlling said motive means to decelerate and stop said car at a landing in a predetermined stopping distance greater than the distance between consecutive landings; a plurality of control means corresponding to said landings for initiating operation of said deceleration means to bring said car to rest at a corresponding landing; and means effective after one of said control means has initiated operation of said deceleration means to prevent a control means corresponding to a landing passed by the car in traversing said predetermined stopping distance from affecting said deceleration means.

10. In an elevator control system, an elevator car operable in a hatchway past a plurality of landings; motive means for said car; deceleration means for controlling said motive means to decelerate and stop said car at a landing in a predetermined stopping distance greater than the distance between consecutive landings when said car is making a run of more than one floor, and to decelerate and stop said car in a distance less than said predetermined distance when said car is making a run of one floor; a plurality of control means corresponding to said landings for initiating operation of said deceleration means to bring the car to rest at a corresponding landing; means effective after one of said control means has initiated operation of said deceleration means, to prevent the control means corresponding to the next succeeding landing from affecting said deceleration means until said operation is completed; and means effective upon restarting of said car to render said last-mentioned means ineffective.

11. In an elevator control system, an elevator car operable in a hatchway past a plurality of landings; motive means for said car; deceleration means for controlling said motive means to decelerate and stop said car at a landing in a predetermined stopping distance greater than the distance between consecutive landings when said car is making a run of more than a predetermined number of floors, and to decelerate and stop said car in a distance less than said predetermined distance when said car is making a run of said predetermined number of floors; a plurality of control means corresponding to said landings for initiating operation of said deceleration means to bring said car to rest at a corresponding landing; means effective after one of said control means has initiated operation of said deceleration means, to prevent the control means corresponding to the next succeeding landing from affecting said deceleration means until said operation is completed; and means effective upon re-starting of said car to render said last-mentioned means ineffective.

12. In an elevator control system, an elevator car operable in a hatchway past a plurality of landings; motive means for said car; deceleration means for controlling said motive means to decelerate and stop said car at a landing in a predetermined stopping distance greater than the distance between consecutive landings; a plurality of control means corresponding to said landings for initiating operation of said deceleration means to stop said car at a corresponding landing; manual means for operating said control means; retaining means for retaining said control means in operated condition after operation thereof by said manual means; means effective after one of said control means has initiated operation of said deceleration means to render the corresponding retaining means ineffective; and means for preventing said last-mentioned means from rendering any other of said retaining means ineffective until said operation is completed.

13. In an elevator control system, an elevator car operable in a hatchway past a plurality of landings; motive means for said car; deceleration means for controlling said motive means to decelerate and stop said car at a landing in a predetermined stopping distance greater than the distance between consecutive landings; a plurality of control means corresponding to said landings for initiating operation of said deceleration means to stop said car at a corresponding landing; manual means for operating said control means; retaining means for retaining said control means in operated condition after operation thereof by said manual means; means effective after one of said control means has initiated operation of said deceleration means to render the corresponding retaining means ineffective; and means for preventing said last-mentioned means from rendering ineffective the retaining means corresponding to a landing passed by said car in traversing said predetermined stopping distance.

14. In an elevator control system, an elevator car operable in a hatchway past a plurality of landings; motive means for said car; deceleration means for controlling said motive means to decelerate and stop said car at a landing in a predetermined stopping distance greater than the distance between consecutive landings when said car is making a run of more than one floor, and to decelerate and stop said car in a distance less than said predetermined distance when said car is making a run of one floor; a plurality of control means corresponding to said landings for initiating operation of said deceleration means to stop said car at a corresponding landing; manual means for operating said control means; retaining means for retaining said control means in operated condition after operation thereof by said manual means; means effective after one of said control means has initiated operation of said deceleration means to render the corresponding retaining means ineffective; and means for preventing said last-mentioned means from rendering the retaining means corresponding to the next succeeding landing ineffective.

15. In an elevator control system, an elevator car operable in a hatchway past a plurality of landings; motive means for said car; deceleration means for controlling said motive means to decelerate and stop said car at a landing in a predetermined stopping distance greater than the distance between consecutive landings when said car is making a run of more than one floor, and to decelerate and stop said car in a distance less than said predetermined distance when said car is making a run of one floor; a plurality of control means corresponding to said landings for initiating operation of said deceleration means to stop said car at a corresponding landing; manual means for operating said control means; retaining means for retaining said control means in operated condition after operation thereof by said manual means; means effective after one of said control means has initiated operation of said deceleration means to render the corresponding retaining means ineffective; means for preventing said last-mentioned means from rendering the retaining means corresponding to the next succeeding landing ineffective; and means effective upon re-starting of said car for rendering said last-mentioned means ineffective.

16. In an elevator system, an elevator car operable in a hatchway; a floor selecting mechanism comprising an element arranged for movement in either of two directions; a switch carried by said car; means for operating said switch when said car reaches each of a plurality of points in said hatchway; means responsive to each operation of said switch, during upward travel of said car, to cause step-by-step movement of said movable element in one of said directions; and means responsive to each operation of said switch, during downward travel of said car, to cause step-by-step movement of said movable element in the other of said directions.

FRANK E. LEWIS.